United States Patent
Coughlin

(12) 
(10) Patent No.: US 10,851,995 B2
(45) Date of Patent: Dec. 1, 2020

(54) HYGIENIC BIRTHDAY CAKE CANDLE EXTINGUISHER

(71) Applicant: Francine Coughlin, Stratford, CT (US)

(72) Inventor: Francine Coughlin, Stratford, CT (US)

(73) Assignee: Francine Coughlin, Stratford, CT (US)

( * ) Notice: Subject to any disclaimer, the term of this patent is extended or adjusted under 35 U.S.C. 154(b) by 50 days.

(21) Appl. No.: 16/221,773

(22) Filed: Dec. 17, 2018

(65) Prior Publication Data

US 2020/0191393 A1 Jun. 18, 2020

(51) Int. Cl.
*F23Q 25/00* (2006.01)
*B01D 46/10* (2006.01)

(52) U.S. Cl.
CPC .............. *F23Q 25/00* (2013.01); *B01D 46/10* (2013.01); *B01D 2275/202* (2013.01); *B01D 2279/65* (2013.01)

(58) Field of Classification Search
CPC ... F23Q 25/00; B01D 46/10; B01D 2275/202; B01D 2279/65; A62C 3/00; A62C 3/008; A62C 3/0207; A62C 8/00; B05B 1/005; B05B 15/40
USPC ............................ 169/91; 431/144, 145, 356
See application file for complete search history.

(56) References Cited

U.S. PATENT DOCUMENTS

| | | | | |
|---|---|---|---|---|
| 1,333,011 A | * | 3/1920 | Crady | ................... B01D 35/00 210/251 |
| 3,168,983 A | | 2/1965 | Bosak | |
| D318,303 S | * | 7/1991 | Valente | ....................... D21/401 |
| 6,010,458 A | | 1/2000 | Roberts | |
| 8,029,232 B2 | * | 10/2011 | Wyatt | ................... F04D 25/084 415/116 |
| 8,500,046 B2 | | 8/2013 | Gilpatrick et al. | |
| 8,820,425 B2 | | 9/2014 | Gatling | |
| 10,125,990 B2 | | 11/2018 | Morales | |
| 10,390,559 B2 | | 8/2019 | Adamic | |
| 2009/0084562 A1 | * | 4/2009 | Gatling | ................... F23Q 25/00 169/91 |
| 2013/0168112 A1 | | 7/2013 | Brown | |
| 2016/0223199 A1 | | 8/2016 | Morris | |

* cited by examiner

*Primary Examiner* — Darren W Gorman
(74) *Attorney, Agent, or Firm* — Willie Jacques; Emanus, LLC

(57) ABSTRACT

A candle blowing device for assisting a person in generating a strong airflow stream while also providing a filter to minimize the spread of germs emanating from the mouth of the person during blowing. The blowing device includes a plurality of body sections forming a mouthpiece, a hollow body, a nozzle, filter media and a shelf configured on one of the plurality of body sections between the mouthpiece and the nozzle for securing the filter media.

3 Claims, 13 Drawing Sheets

HYGIENIC BIRTHDAY CAKE CANDLE EXTINGUISHER

FIELD OF THE DISCLOSURE

The invention relates to a device for extinguishing candles. More particularly, this invention pertains to an economical, effective, and easy to use device for blowing out candles on a birthday cake while also minimizing the spread of germs emanating from the mouth during blowing.

BACKGROUND OF THE DISCLOSURE

Cakes for occasions such as holidays, weddings, Bar Mitzvahs, and birthdays are often adorned with lighted candles meant to commemorate the occasion being celebrated. Before serving the cake, the lighted candles are blown out (i.e., extinguished) by the person or persons involved in the commemorating celebration. During the act of blowing out candles, there is a concern that germs may be transmitted to the cake, or other shared items, particularly if one or more persons blowing out the candle(s) is sick. The same concern exists such as in the case of a person having little control of their faculties causing contamination (e.g., expulsion of spittle or other matter from the mouth) onto the cake or shared item.

Prior art devices such as that disclosed in U.S. Pat. Publ. No. 2013/0168112 A1 to Brown describe a candle extinguisher including a filter for preventing contamination during the process of blowing out candles. The device, however, is adjoined along the length of two tubular body sections, each constructed with a diametrically facing slot for holding a screen (with holes sized to allow the passage of air but restricting the flow of liquid and projectiles) in place between the body sections. This type of longitudinal construction requires exacting, precision manufacturing in order to properly locate the screen in the designated slot thereby contributing to inefficient assembly and higher manufacturing cost. Furthermore, sufficient tolerance is required in the width of the slots to assure proper placement of the screen; however, such tolerance potentially allows passage of contaminants via gaps between the screen and slot. In addition, to maximize safety from airborne contaminants, screens (e.g., filters) should meet medical grade filtration requirements and their retention design should assure no passage of contaminants around the periphery of the screen.

Many celebratory occasions having lighted candles on cakes or other items necessitate that the candle(s) be completely extinguished. Persons with little or compromised capacity for completely blowing out the candles (e.g., creating a strong and continuous airflow stream) may experience less than desirable results that may cause stress to the person(s) and also necessitate repeated blowing. Such repeated blowing not only slows the celebration, but also exacerbates continued potential contamination of the cake or other shared items. The prior art, such as shown in U.S. Pat. Publ. No. 2013/0168112 A1 to Brown and U.S. Pat. Publ. No. 2016/0223199 A1 to Morris, has typically relied upon creating a desired airflow stream using generally conical-shaped tubes where a user blows air into the larger end of the tube and the air exits the smaller end of the tube with greater force and velocity (i.e., nozzle effect). Though these prior art methods accomplish the end goal of creating a stronger airflow stream toward the candle, they unduly restrict the shape of the candle extinguisher to cone-shaped. Filtered extinguishers such as that disclosed in U.S. Pat. No. 8,820,425 B2 to Gatling lets a user blow into a conical-shaped tube from the smaller end of the device; however, the device does not provide a nozzle for creating a stronger airflow stream at the larger end (i.e., exit point).

Therefore, there is a need for a device that enhances the protection of a cake or other shared items from contamination while a person is engaged in blowing out candles. There is also a need that such a device provides to persons with little capacity for generating a strong airflow stream assistance in blowing out the candles, without necessarily restricting the device to being conical (i.e., nozzle-like) in shape. Furthermore, a need exists for such a device to be easily and inexpensively manufactured.

SUMMARY OF THE DISCLOSURE

In various aspects of the present disclosure, a blowing device for extinguishing candles on a cake or other shared items is provided. In one aspect of the present disclosure, the problem of potentially damaging the filter media during assembly of longitudinal sections of a blowing device with slots is avoided by capturing the filter media and assembling it between conical sections of a blowing device. Also, as shown in the prior art U.S. Pat. Publ. No. 2013/0168112 A1, FIG. 1, a slot gap that is too wide or too narrow invites potential blow-by of spittle or other contaminants or the need for exacting tolerances which slows down and/or adds to the expense of manufacturing, respectively. As such, one embodiment of a blowing device of the present disclosure comprises a conical-shaped section (i.e., shell) assembled from two or more conical sections encapsulating and securing a generally disc-shaped filter media. The filter media is held in place by resting on a shelf configured on one of the two or more conical sections and held down by a fence configured on an adjacent conical section on the opposite side of the filter media. The cone-shaped shell includes a mouthpiece at the larger diameter end of the shell, where the user blows air into the device, and a nozzle at the smaller diameter end of the shell where the user-blown air exits the device at a higher velocity.

In another aspect of the present disclosure, the real potential problem of allowing harmful particles from a user's mouth to escape through a blowing device using screens consisting of 0.066-inch (i.e., 1676 micron) diameter holes, as disclosed in U.S. Pat. Publ. No. 2013/0168112 A1, FIGS. 3, 4, and 6 to Brown, is nearly eliminated in embodiments of the present disclosure by use of a medical grade filter media which is able to effectively filter particulates smaller than one micron in size.

In a further aspect of the present disclosure, complexity of assembly and higher manufacturing costs of a blowing device, while also providing filtration means, may be reduced by providing in another embodiment of a blowing device a one-piece conical-shaped shell including a retainer assembly that encapsulates and secures a disc-shaped filter media, respectively. The filter media is held in place within the blowing device by enclosing it in the retainer assembly and then welding the retainer assembly to the interior of the blowing device.

In yet another aspect of the present disclosure, limitations related to the shape of a blowing device for providing a strong airflow stream to extinguish candles is avoided by including a nozzle configuration within the body of the blowing device. In an embodiment of the present disclosure, a nozzle configuration is configured in a blowing device irrespective of the shape of the device or the direction of the airflow stream. For example, a person is able to blow into the smaller diameter end of a conical-shaped blowing device toward the larger diameter end, however, still create a stronger airflow stream exiting the device.

In the various embodiments, as discussed above and below, the filter media is generally disposed at ⅓ of the length of the blowing device away from the mouthpiece end. Location of the filter media is exemplary only as it may be disposed distally at any location within the blowing device that allows capture of contaminants from a user's mouth and provides sufficient airflow stream to extinguish a candle.

Other systems, methods, features, advantages, and aspects of this disclosure will be apparent to one with skill in the art upon examination of the following descriptions and the accompanying drawings. It is intended that all such additional systems, methods, features, advantages, and aspects be included within this description and be within the scope of the present disclosure.

BRIEF DESCRIPTION OF THE DRAWINGS

These drawings are for illustrative purposes only and are not drawn to scale (e.g., hidden lines of shell structures do not represent exact thicknesses of the structure walls). Like numbers represent like features and components in the drawings. While the specification concludes with claims particularly pointing out and distinctly claiming particular embodiments of the present disclosure, various embodiments of the present disclosure can be more readily understood and appreciated from the following descriptions of various embodiments of the present disclosure when read in conjunction with the accompanying drawings, in which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1A:
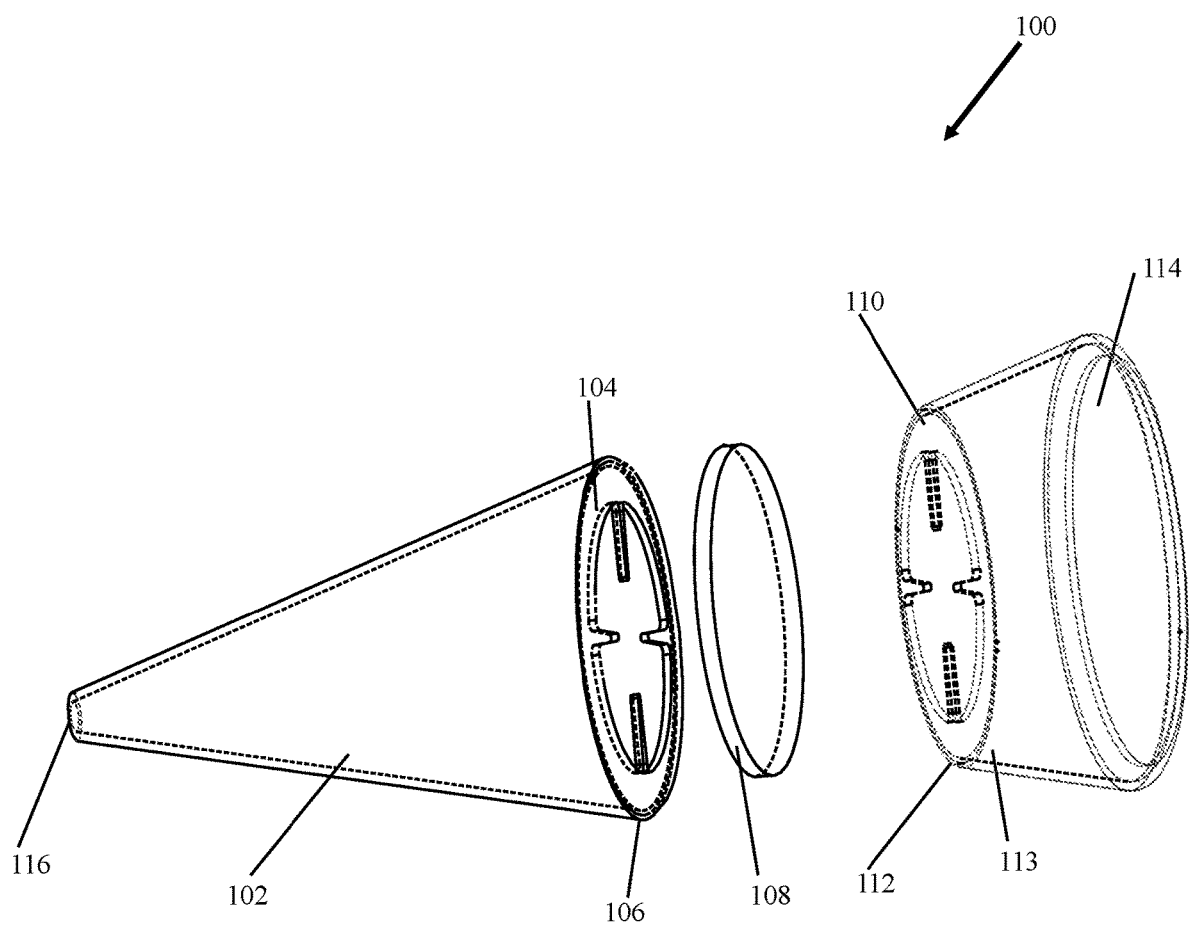
FIG. 1A is an exploded view of a blowing device for extinguishing candles on a cake or other shared item, according to an embodiment of the present disclosure.

FIG. 1A is an exploded view of a blowing device 100 for extinguishing candles on a cake or other shared item 520 (See FIG. 6), according to an embodiment of the present disclosure. The blowing device 100 includes a first conical section 102, and a shelf 104 and inner wall 106 configured within the first conical section 102, respectively. The blowing device 100 also includes a second conical section 113, a filter media 108, and a fence 110 and outer wall 112 configured on the second conical section 113, respectively. Furthermore, a mouthpiece 114 is provided at the largest diameter end of blowing device 100 and a nozzle 116 is provided at the smallest diameter end of blowing device 100.

The first conical section 102 and second conical section 113 are generally thin-walled hollow bodies. Filter media 108 sits between the first and second conical sections 102 and 113, respectively, having a diameter that allows it to be overlappingly seated on shelf 104 within inner wall 106. In this exemplary embodiment, shelf 104 is recessed within conical section 102. The second conical section 113 is assembled to the first conical section 102 wherein the fence 110 is caused to be tightly pressed against the filter media 108 thereby securing it to the shelf 104 of conical section 102. Conical sections 102 and 113 are then adjoined to each other (including filter media 108) by sonic welding, gluing, or other adhering means to assure an air-tight seal between inner wall 106 and outer wall 112 thereby forming blowing device 100 as shown in FIGS. 2A-2D. In the present embodiment, fence 110 is molded, machined, or otherwise configured integrally with the second conical section 113; however, fence 110 may also be a separate component that is welded to the conical section 113. Additionally, by reference to FIGS. 1B-1D, fence 110 may be alternatively configured to press against filter media 108. Those of skill in the art will readily appreciate that other configurations of fence 110 are also appropriate for holding filter media 108 on shelf 104.

Figure 2A:
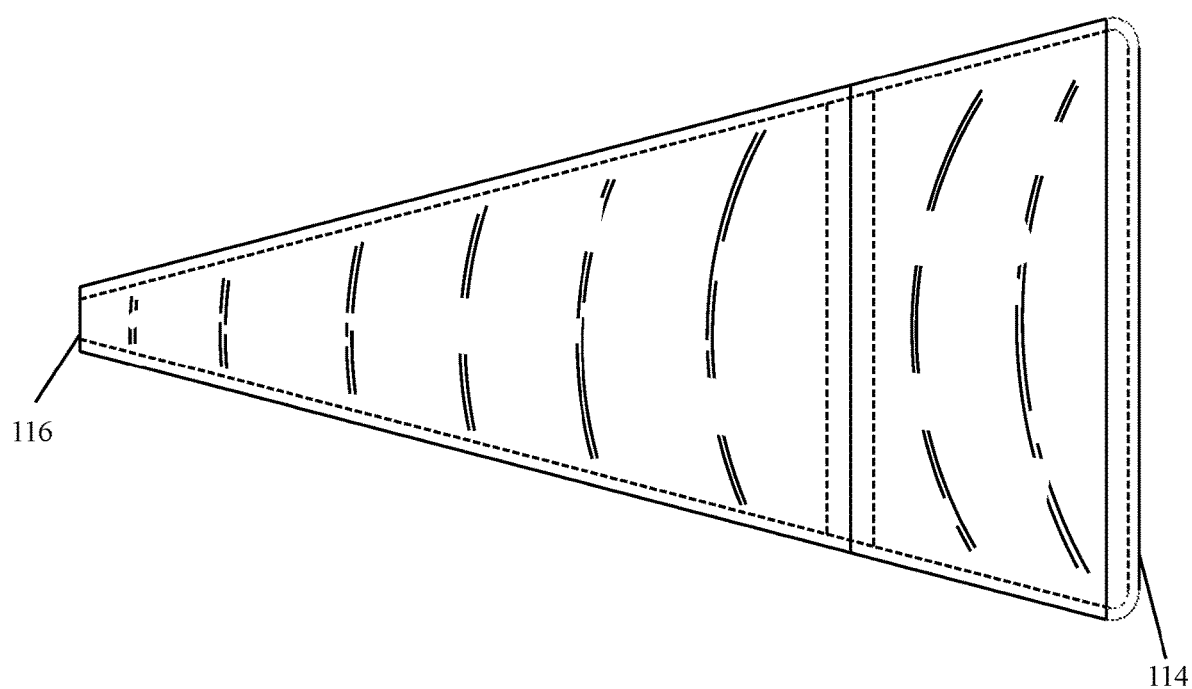
FIG. 2A is a side elevational view of the blowing device of FIG. 1A, according to an embodiment of the present disclosure.
Figure 2B:
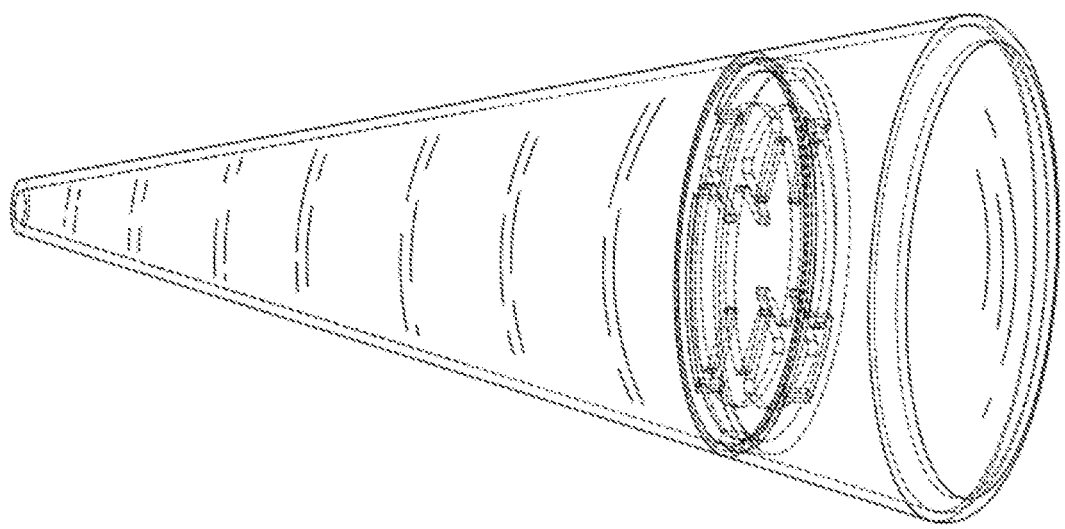
FIG. 2B is a side perspective view of the blowing device of FIG. 1A, according to an embodiment of the present disclosure.
Figure 2C:
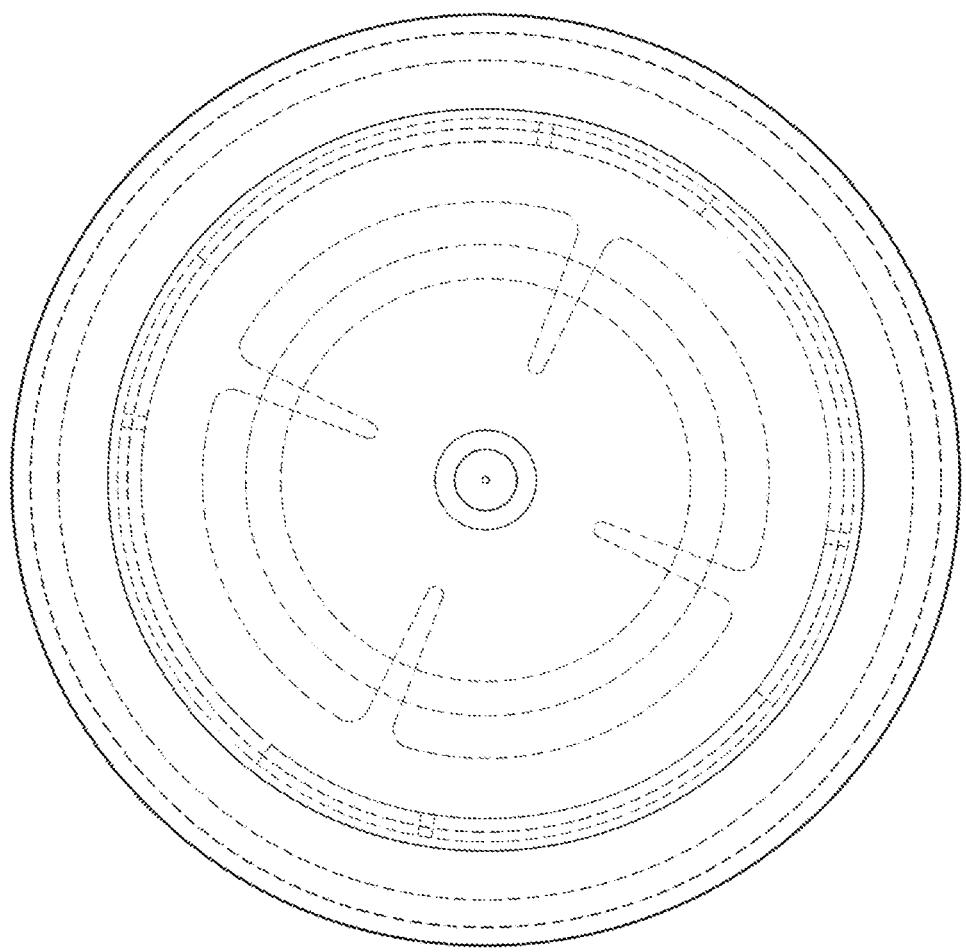
FIG. 2C is a front elevational view of the blowing device of FIG. 1A, according to an embodiment of the present disclosure.
Figure 2D:
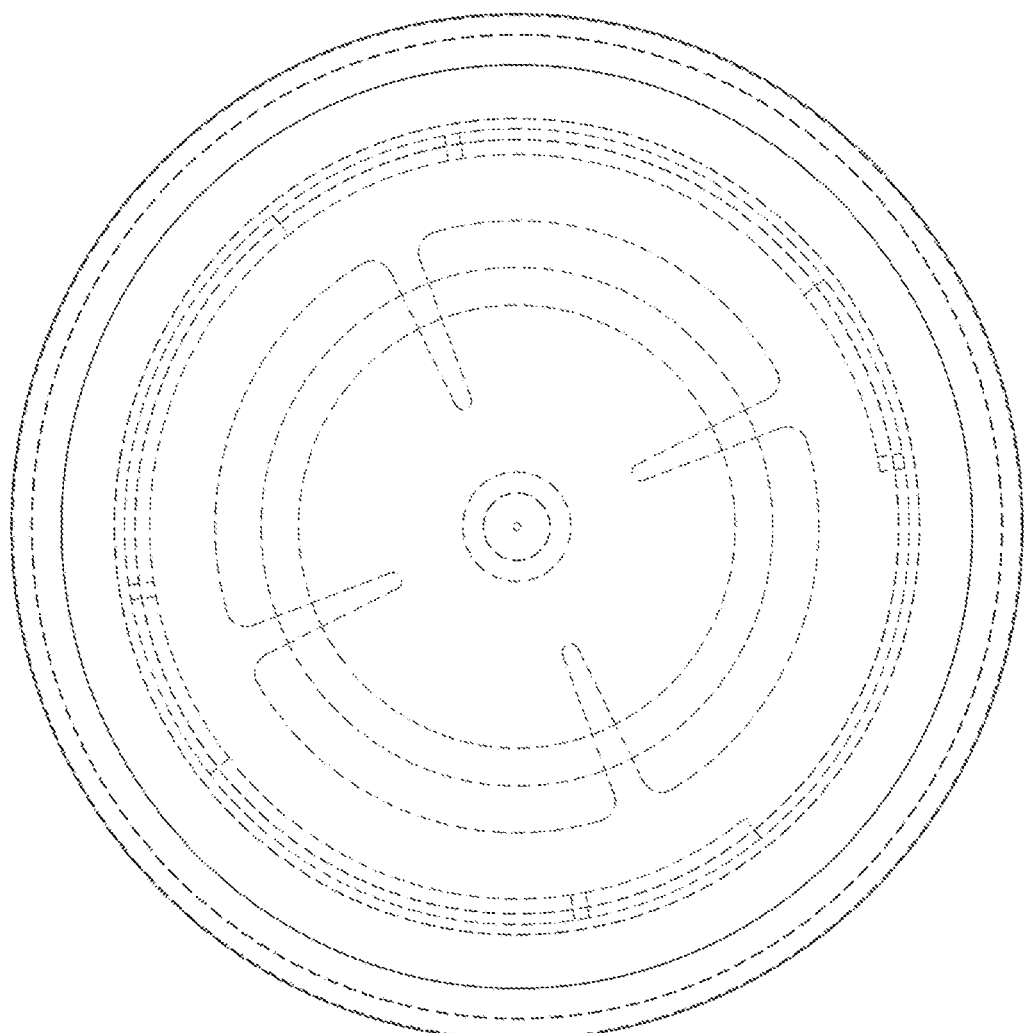
FIG. 2D is a rear elevational view of the blowing device of FIG. 1A, according to an embodiment of the present disclosure.
Figure 6:
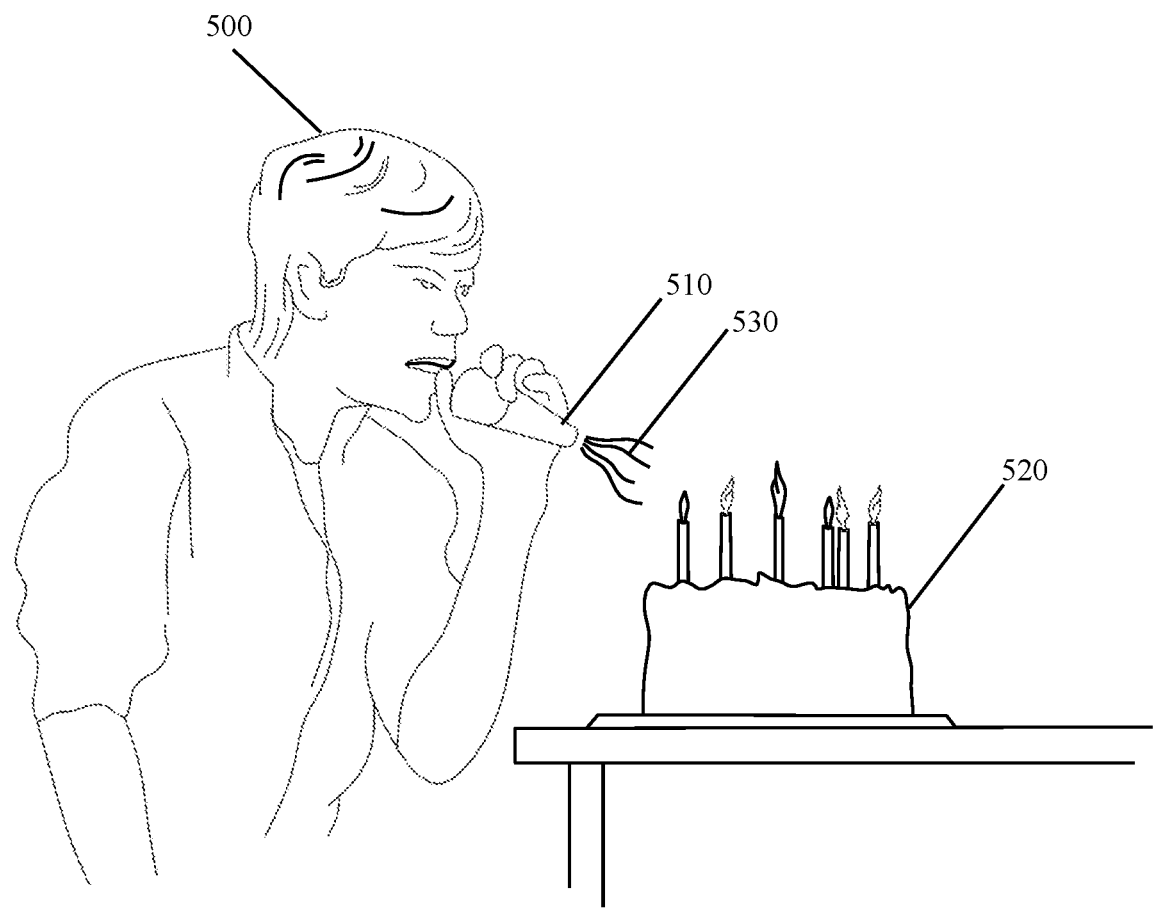
FIG. 6 is an illustration of a person using the blowing device to extinguish candles on a cake.

By reference to FIGS. 1A, 2A, and 6, a person 500 blows air into the blowing device 100 at the mouthpiece 114 wherein the air passes through filter media 108 and exits at nozzle 116. Those of skill in the art will readily appreciate that air blown through a narrowing conical hollow body from the larger diameter end to the smaller diameter end of the hollow body, as depicted in FIG. 2A, will cause the airflow stream 530 to exit the nozzle 116 with greater speed and force.

In a preferred embodiment, filter media 108 is a HEPA-type medical grade filter material such as Technostat® 150 Plus Filter Media which filters particulates smaller than one micron to assure maximum protection. Test results of blowing device 100 of the present disclosure show at least 99.99% virus filtration efficiency (VFE) and 99.78% bacterial filtration efficiency (BFE) at increased challenge levels in performance as a birthday cake candle extinguishing device.

Figure 3A:
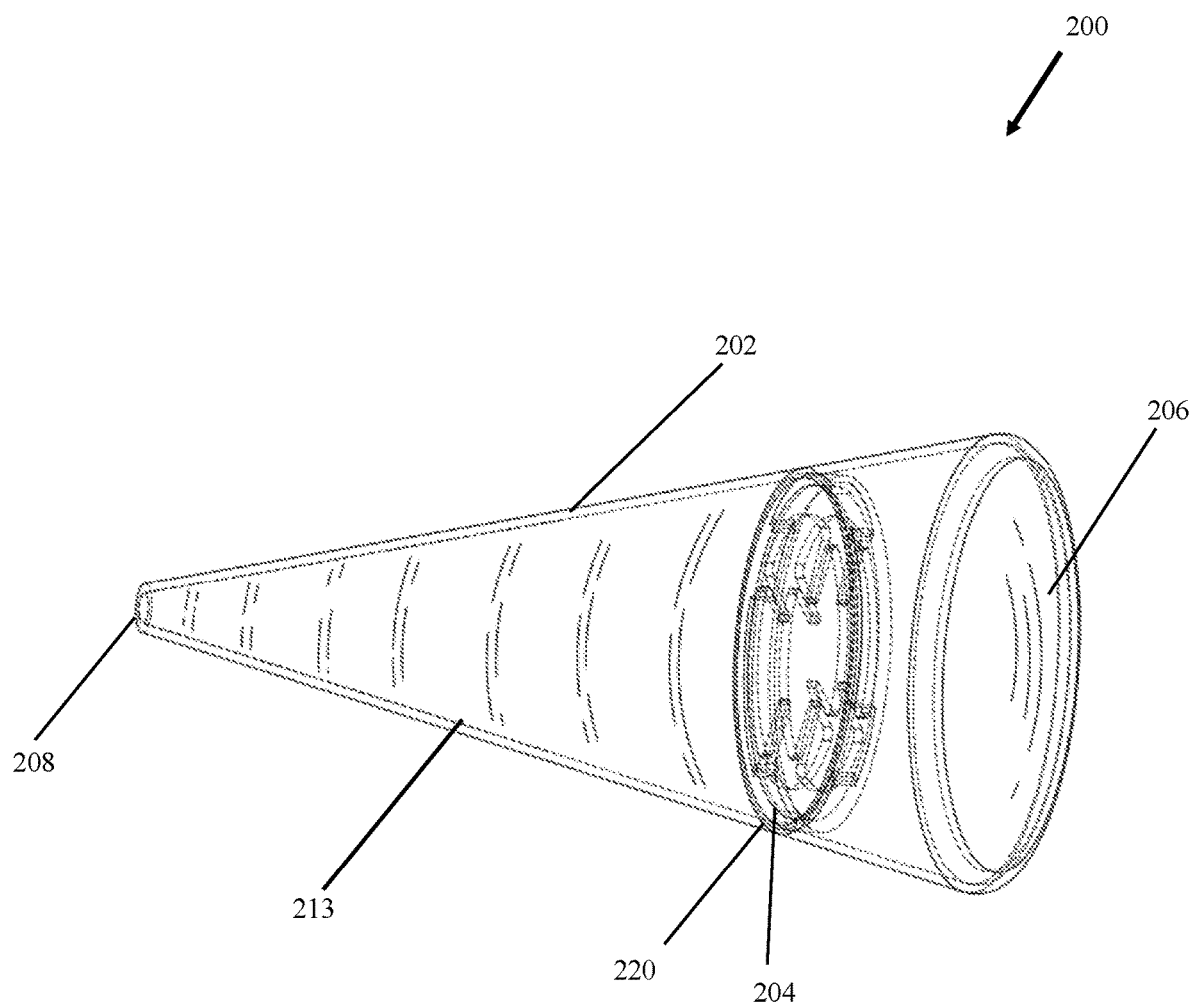
FIG. 3A is a side elevational view of a one-piece blowing device, showing enclosed filter media retainer assembly (hidden lines), according to another embodiment of the present disclosure.
Figure 3B:
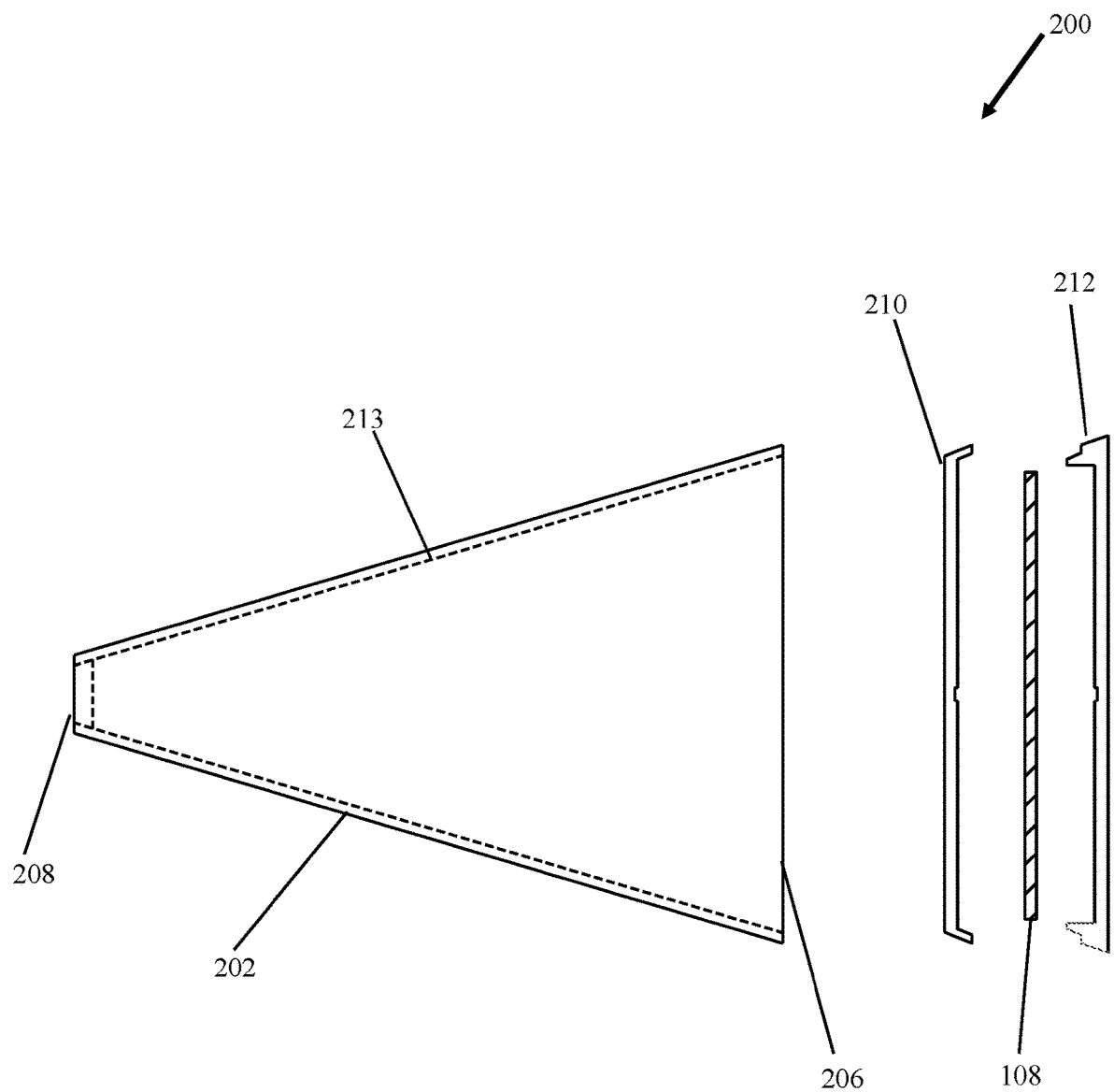
FIG. 3B is an exploded view of the blowing device of FIG. 3A, according to another embodiment of the present disclosure.

In accordance with another embodiment of the present disclosure, FIGS. 3A and 3B illustrate a blowing device 200 configured from a hollow one-piece conical section 202. Blowing device 200 includes a retainer assembly 204 configured to be welded onto inner wall 213 within the conical section 202 of blowing device 200 thereby restricting passage of contaminants at the interface 220 of the conical section 202 and retainer assembly 204. The retainer assembly is formed from the assembly of a nozzle-side retainer clip 210 and a mouthpiece-side retainer clip 212 each together enclosing filter media 108. The retainer assembly 204, including filter media 108, when welded at interface 220, is generally disposed at ⅓ of the length of the conical section 202 away from the mouthpiece 206 end. Those of skill in the art will readily appreciate that the retainer assembly may be welded to blowing device 200 by sonic welding, gluing, or other adhering means to assure an air-tight seal at interface 220 as shown in FIG. 3A.

Figure 4:
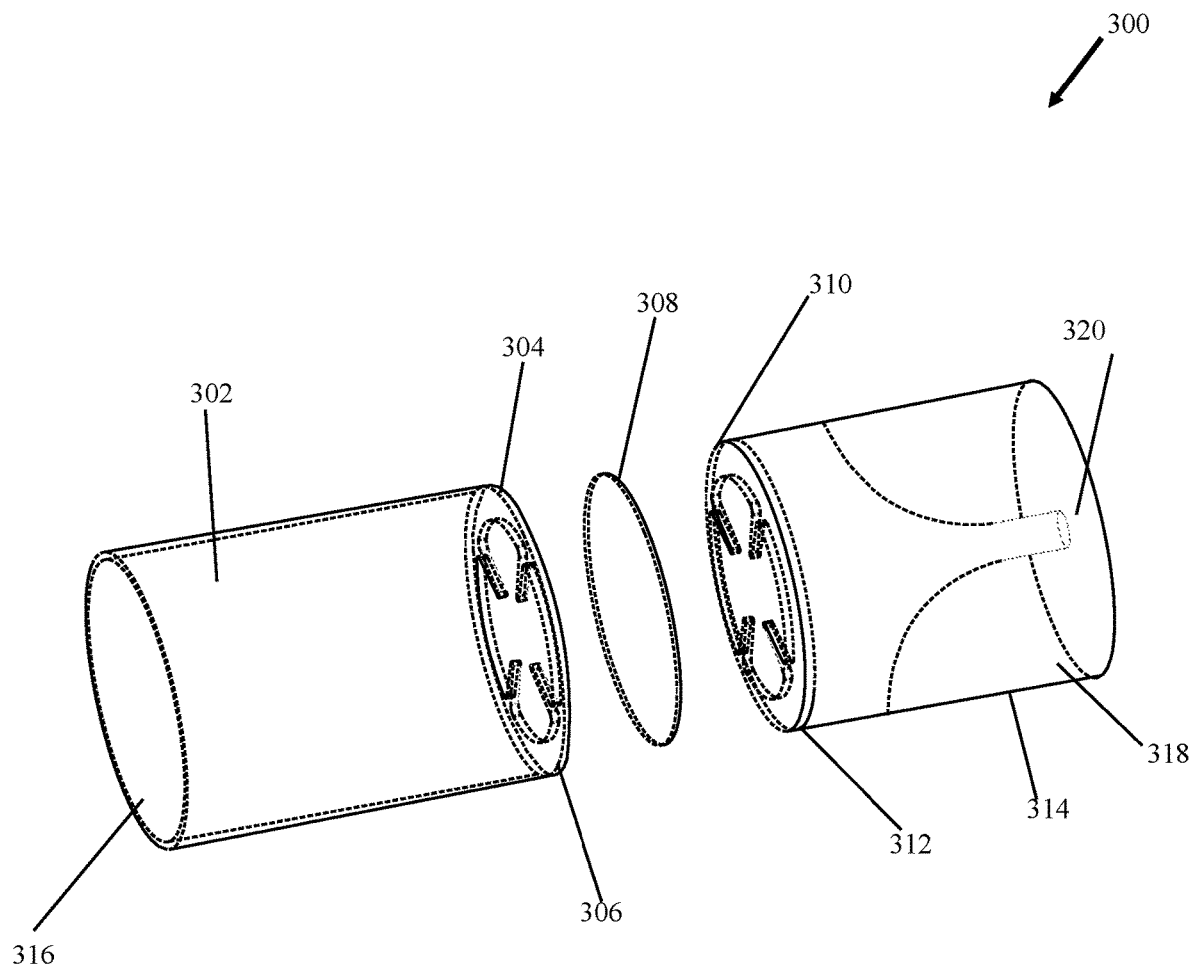
FIG. 4 is an exploded view of a blowing device for extinguishing candles on a cake or other shared item showing an alternative cylindrical blowing device shape, and nozzle configuration, respectively, according to an embodiment of the present disclosure.

As shown in FIG. 4, and in accordance with the present disclosure, an alternate embodiment of a blowing device 300 provides a cylindrical-shaped blowing device, while restricting contamination of a cake or other shared item and also generating a strong airflow stream for extinguishing candles.

The blowing device 300 includes a first cylindrical section 302, and a shelf 304 and inner wall 306 configured within the first cylindrical section 302, respectively. The blowing device 300 also includes a second cylindrical section 314, a filter media 308, and a fence 310 and outer wall 312 configured on the second cylindrical section 314, respectively. Furthermore, a mouthpiece 316 is provided on the first cylindrical section 302 and a nozzle 318 is provided within the second cylindrical section 314 of blowing device 300.

Figure 1B:
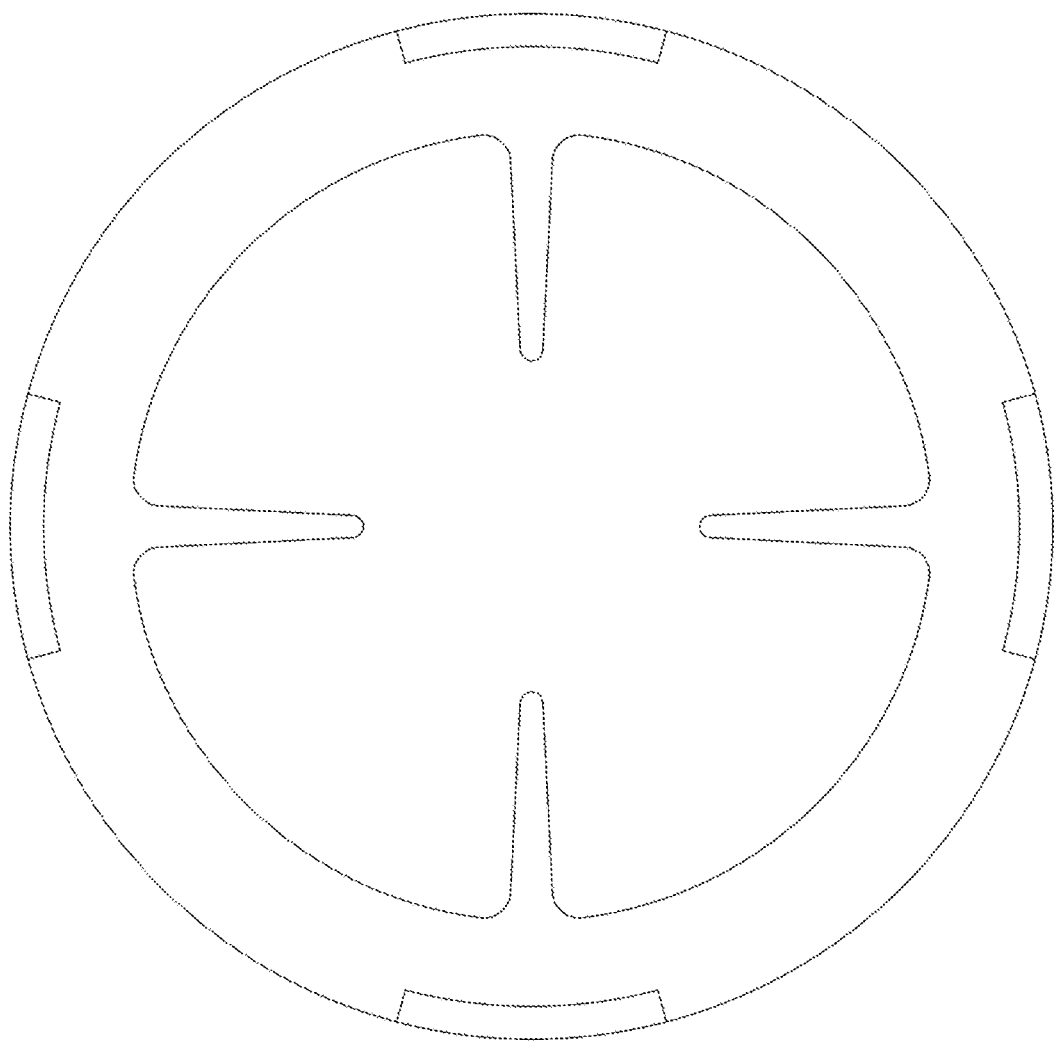
FIGS. 1B-1D are alternative configurations of a filter media retaining fence, according to various embodiments of the present disclosure.
Figure 1C:
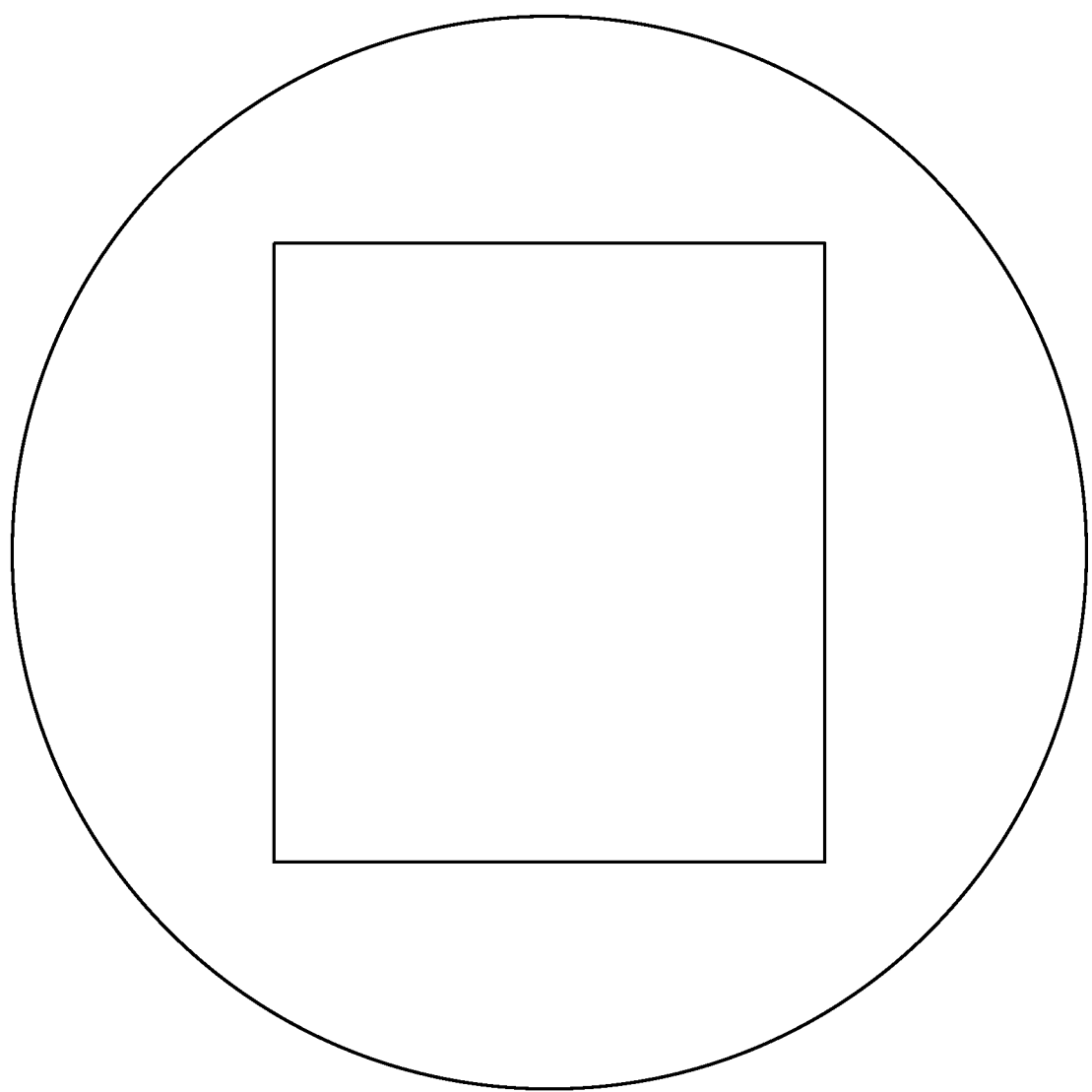
Figure 1D:
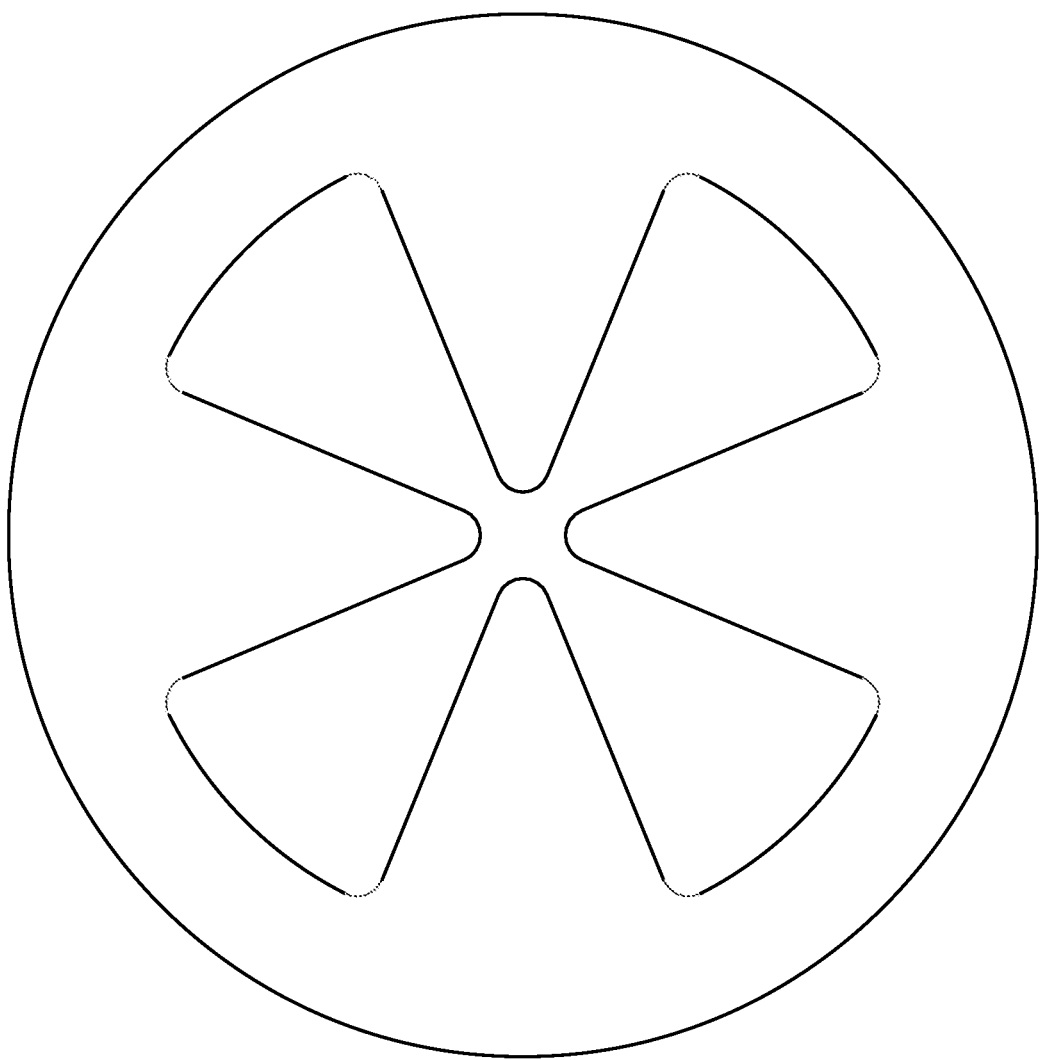

The first cylindrical section 302 and second cylindrical section 314 are generally thin-walled hollow bodies. Filter media 308 sits between the first and second cylindrical sections 302 and 314, respectively, having a diameter that allows it to be overlappingly seated on shelf 304 within inner wall 306. The second cylindrical section 314 is assembled to the first cylindrical section 302 wherein the fence 310 is caused to be tightly pressed against the filter media 308 thereby securing it to the shelf 304 of cylindrical section 302. Cylindrical sections 302 and 314 are then adjoined to each other (including filter media 108) by sonic welding, gluing, or other adhering means to assure an air-tight seal between inner wall 306 and outer wall 312, thereby forming blowing device 300 as shown in FIG. 4. In the present embodiment, fence 310 is molded, machined, or otherwise configured integrally with the second cylindrical section 314; however, fence 310 may also be a separate component that is welded to the cylindrical section 314. Additionally, by reference to FIGS. 1B-1D, fence 310 may be alternatively configured as shown in FIGS. 1B-1D to press against filter media 308. Those of skill in the art will readily appreciate that other configurations of fence 310 are also appropriate for holding filter media 308 on shelf 304.

Referring again to FIG. 4, a nozzle 318 may be configured for blowing device 300 and not require that the blowing device be constrained to a particular shape. Candle blowing devices shaped like cones, for instance, rely on a cone's narrowing (i.e., constricting) volume from the mouthpiece end to the exit end to accelerate and speed up the airflow stream of a person blowing into the device. In an embodiment of the present disclosure, exemplary blowing device 300 includes a nozzle 318 that is shaped to generate a strong airflow stream at the nozzle exit 320. Nozzle 318 is similar to that which may be used in rockets wherein the nozzle 318 presents a decreasing volume toward its exit point 320 thereby causing the user's 500 airflow stream 530 to be stronger, such as toward a cake with candles 520 as shown in FIG. 6.

In the present exemplary embodiment, nozzle 318 is molded or machined within, or otherwise configured integrally with the second cylindrical section 314; however, nozzle 318 may also be a separate component that is held within cylindrical section 314 by welding (e.g., sonic welding, gluing, or other adhering means) inside the cylindrical section 314. Additionally, by reference to FIG. 4, exemplary nozzle 318 is cone-shaped; however, those of skill in the art will readily appreciate that air blown through a narrowing hollow body, of various shapes, having the air move from a larger end to a smaller end of the hollow body will cause the airflow stream 530 to exit the nozzle 318 with greater speed and force.

Without loss of the scope of the present disclosure, either of shelf 304, inner wall 306, mouthpiece 316, fence 310, outer wall 312, nozzle 318, and/or permutations thereof may alternatively be configured on the first cylindrical section 302 or second cylindrical section 314.

Figure 5:
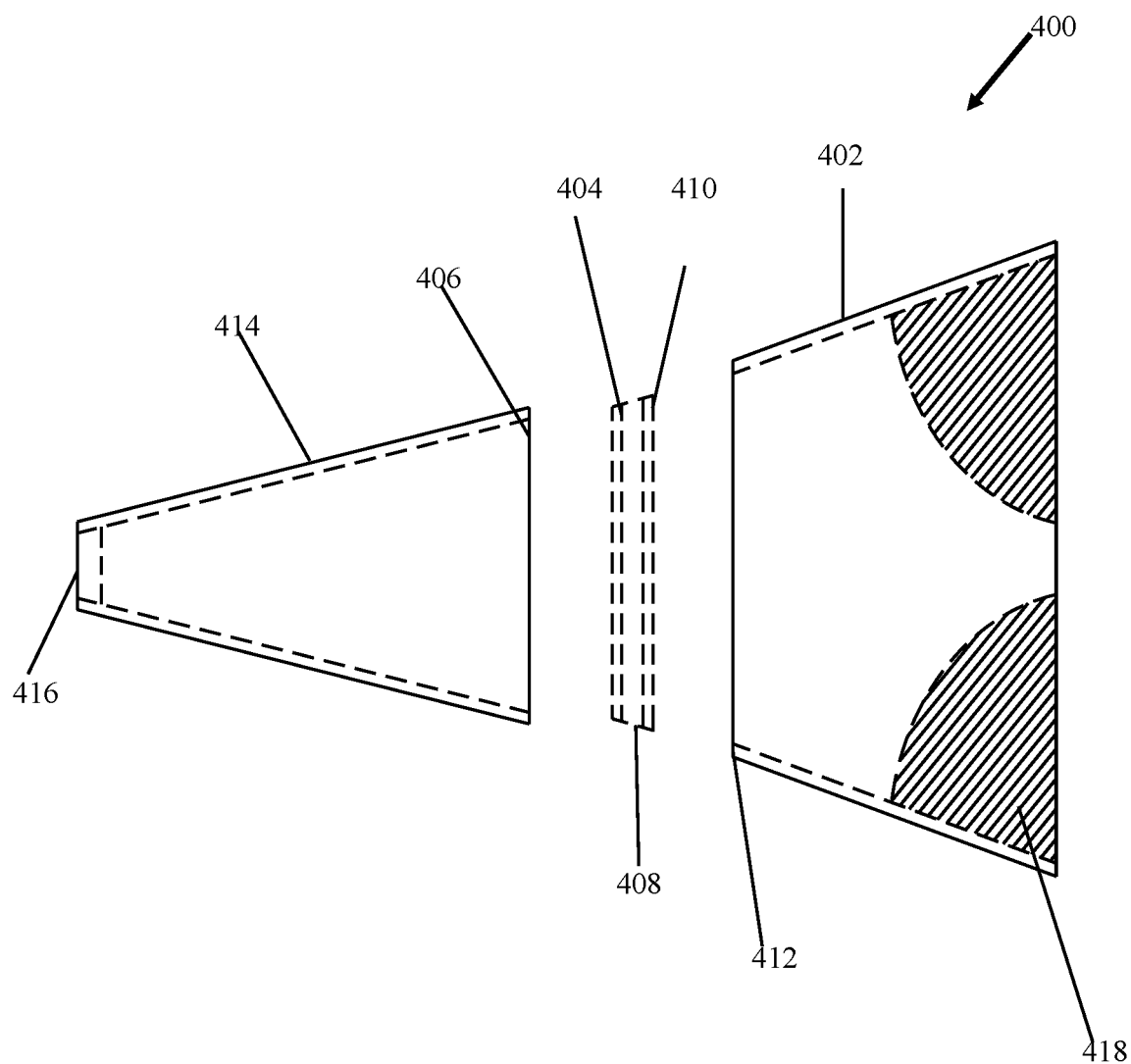
FIG. 5 is a sectioned elevational view of a conical-shaped blowing device showing an alternative nozzle configuration, according to an embodiment of the present disclosure.

FIG. 5 is a sectioned perspective view of a conical-shaped blowing device 400 showing an alternative nozzle 418, according to an embodiment of the present disclosure. The blowing device 400 includes a first conical section 402, and a shelf 404 and inner wall 406 configured within the first conical section 402, respectively. The blowing device 400 also includes a second conical section 414, a filter media 408, and a fence 410 and outer wall 412 configured on the second conical section 414, respectively. Furthermore, a mouthpiece 416 is provided at the smaller diameter end of blowing device 400 and a nozzle 418 is provided at the larger diameter end of blowing device 400.

The first conical section 402 and second conical section 414 are generally thin-walled hollow bodies. Filter media 408 sits between the first and second conical sections 402 and 414, respectively, having a diameter that allows it to be overlappingly seated on shelf 404 within inner wall 406. The second conical section 414 is assembled to the first conical section 402 wherein the fence 410 is caused to be tightly pressed against the filter media 408 thereby securing it to the shelf 404 of conical section 402. Conical sections 402 and 414 are then adjoined to each other (including filter media 408) by sonic welding, gluing, or other adhering means to assure an air-tight seal between inner wall 406 and outer wall 412 thereby forming blowing device 400 as shown in FIG. 5. In the present embodiment, fence 410 is molded, machined, or otherwise configured integrally with the second conical section 414; however, fence 410 may also be a separate component that is welded to the conical section 414. Additionally, by reference to FIGS. 1B-1D, fence 410 may be alternatively configured as shown in FIGS. 1B-1D to press against filter media 408. Those of skill in the art will readily appreciate that other configurations of fence 410 are also appropriate for holding filter media 408 on shelf 404.

In the exemplary embodiment of blowing device 400, the constructional and functional features of nozzle 418 are similar to that of nozzle 318 of FIG. 4. Unlike prior art candle blowing devices, the blowing device 400 demonstrates that a blowing device need not rely on the shape of a narrowing body structure (e.g., hollow tube or cone) to produce a stronger airflow stream.

FIG. 6 is an illustration of a person 500 using the blowing device 510 to extinguish candles on a cake 520 via airflow stream 530. The exemplary blowing device 510 is representative of above exemplary blowing devices 100, 200, 300, and 400.

INDUSTRIAL APPLICABILITY

The present disclosure relates to the blowing devices 100, 200, 300, 400, and 510 useful for extinguishing candles on a cake or other shared item 520. The blowing devices 100, 200, 300, 400, and 510 are constructed, generally, of conical body sections 102, 113, 202, 302, 314, 402, and 414, respectively. Those of skill in the art will appreciate that blowing devices 100, 200, 300, 400, and 510 are not limited to one or two conical sections, however, may be constructed of a plurality of conical sections. Also, those of skill in the art will appreciate that the exemplary blowing device 300 and 400 may be constructed of various shaped hollow bodies utilizing nozzles 318 and 418, respectively. Furthermore, those of skill in the art will appreciate that the exemplary embodiments of blowing devices 100, 200, 300, 400, and 510 may be made from various materials such as ABS plastic, high impact polystyrene, glass, metals, wood, etc.

In accordance with the present disclosure, the blowing devices 100, 200, 300, and 400 eliminate the need for a raised lip at the mouthpiece 114, 206, 316, and 416, respectively. Exemplary blowing device 100, 200, 300, and 400 are advantaged by using the mold finish on respective body sections (e.g., SPI B1 mold finish) to assist a user 500 in holding the blowing device in their mouth.

In the exemplary embodiments, blowing device 100 and 200 have a mouthpiece inside diameter of about 1.15 inches, a nozzle inside diameter of about 0.10 inches, and a total length of about 4.05 inches (not shown) to enhance the strength of a user 500 airflow stream 530. Likewise, exemplary embodiments 300 and 400 incorporate nozzle 318 and 418, respectively, which sufficiently increase the force of the airflow stream 530 for extinguishing candles.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

LIST OF ELEMENTS

100 Blowing device
102 First conical section
104 Shelf
106 Inner wall
108 Filter media
110 Fence
112 Outer wall
113 Second conical section
114 Mouthpiece
116 Nozzle
200 Blowing device
202 One piece conical-shaped section
204 Retainer assembly
206 Mouthpiece
208 Nozzle
210 Retainer clip, nozzle-side
212 Retainer clip, mouthpiece-side
213 Inner wall, one piece conical-shaped section
300 Blowing device
302 First cylindrical section
304 Shelf
306 Inner wall
308 Filter media
310 Fence
312 Outer wall
314 Second cylindrical section
316 Mouthpiece
318 Nozzle
320 Nozzle exit
400 Blowing device
402 First conical section
404 Shelf
406 Inner wall
408 Filter media
410 Fence
412 Outer wall
414 Second conical section
416 Mouthpiece
418 Nozzle
500 Person using a blowing device
510 Blowing device
520 Cake with candles
530 Airflow stream

What is claimed is:

1. A blowing device for extinguishing candles on a cake or other shared item, the blowing device comprising:
 a filter media;
 a first hollow conical section including:
 a shelf configured on the first conical section for receiving the filter-media;
 an inner wall configured on the first conical section; and
 a nozzle;
 a second hollow conical section including:
 a fence configured on the second conical section for securing the filter media therebetween said fence and the shelf;
 an outer wall configured on the second conical section;
 a mouthpiece; and
 an interface for attaching the first conical section to the second conical section, wherein the first conical section and the second conical section are adjoined at interface of the inner wall and the outer wall.

2. The blowing device of claim 1, wherein the mouthpiece is located at the largest diameter of the second conical section.

3. The blowing device of claim 1, wherein the nozzle is located at the smallest diameter of the first conical section.

* * * * *